United States Patent [19]
Stransky et al.

[11] Patent Number: 5,182,905
[45] Date of Patent: Feb. 2, 1993

[54] METHOD FOR AUTOMATIC BYPASS OPERATION

[75] Inventors: Larry W. Stransky, West Chester; Valentine R. Boehm, Jr.; Michael A. Phillips, both of Cincinnati, all of Ohio

[73] Assignee: General Electric Company, Cincinnati, Ohio

[21] Appl. No.: 793,984

[22] Filed: Nov. 18, 1991

Related U.S. Application Data

[62] Division of Ser. No. 522,024, May 11, 1990.

[51] Int. Cl.$^5$ .............................................. F02K 3/04
[52] U.S. Cl. ....................................... 60/204; 60/226.3
[58] Field of Search ................... 60/204, 226.1, 226.3, 60/224, 262, 226.2

[56] References Cited

U.S. PATENT DOCUMENTS

| | | | |
|---|---|---|---|
| 3,316,717 | 5/1967 | Castle et al. | 60/226.3 |
| 3,514,952 | 6/1970 | Schumacher et al. | 60/226.2 |
| 3,910,529 | 10/1975 | Putnam | 60/226.1 |
| 3,964,257 | 6/1976 | Lardellier | 60/226.1 |
| 4,043,121 | 8/1977 | Thomas et al. | 60/226.3 |
| 4,715,779 | 12/1987 | Suciu | 60/226.1 |
| 4,791,783 | 12/1988 | Neitzel | 60/226.3 |

Primary Examiner—Louis J. Casaregola
Assistant Examiner—Timothy S. Thorpe
Attorney, Agent, or Firm—Jerome C. Squillaro; David L. Narciso

[57] ABSTRACT

A bypass valve assembly for a gas turbine engine includes a frame defining a first flow channel in flow communication, second and third flow channels separated by a splitter. A plurality of circumferentially juxtaposed bypass doors are disposed in the second channel and are positionable between a closed position preventing airflow into the second channel and an open position providing for airflow into the second channel. Means for automatically positioning the doors in the open and closed positions provides differential pressure across the doors in the second channel, and include a spring which provides a closing torque on the door.

4 Claims, 3 Drawing Sheets

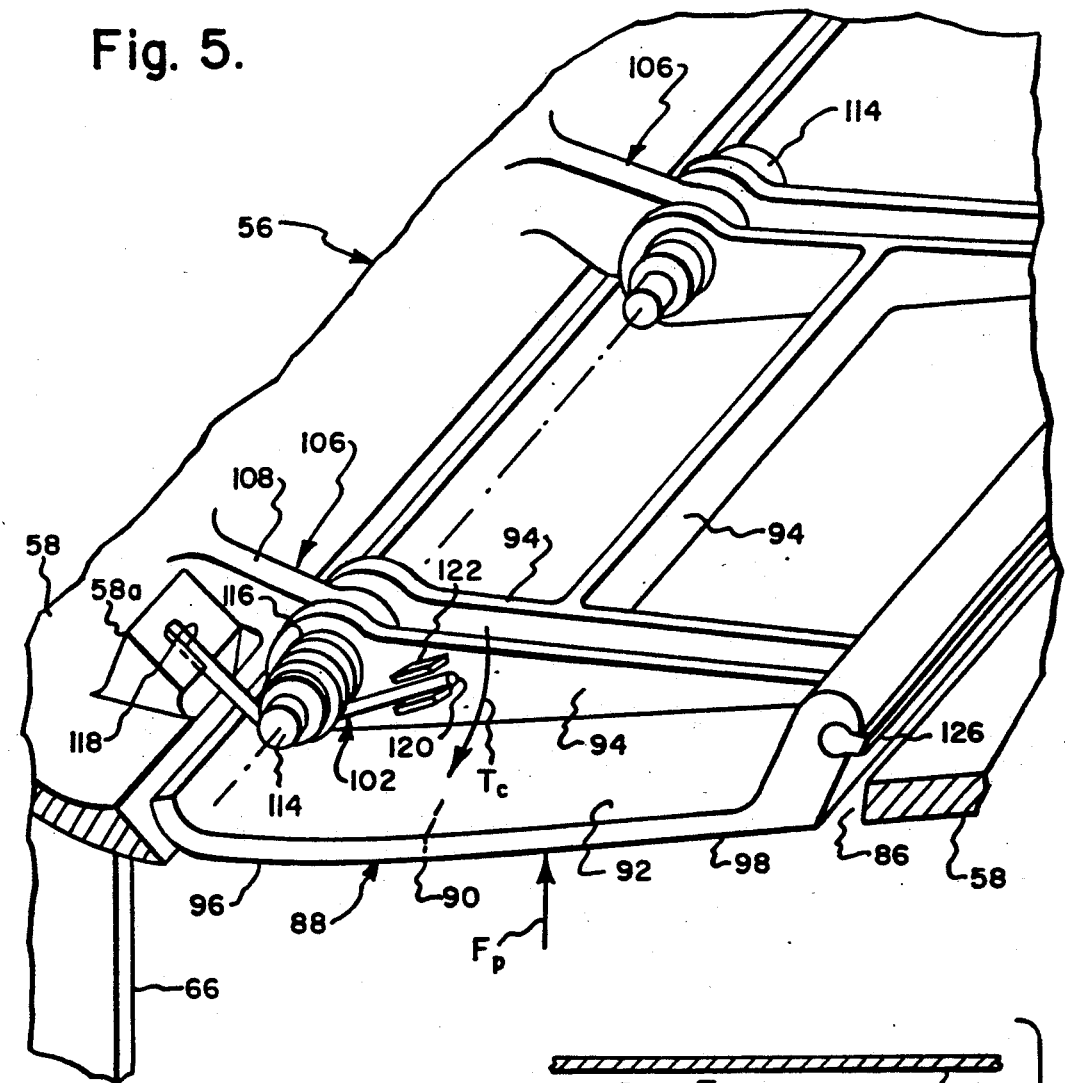
Fig. 5.
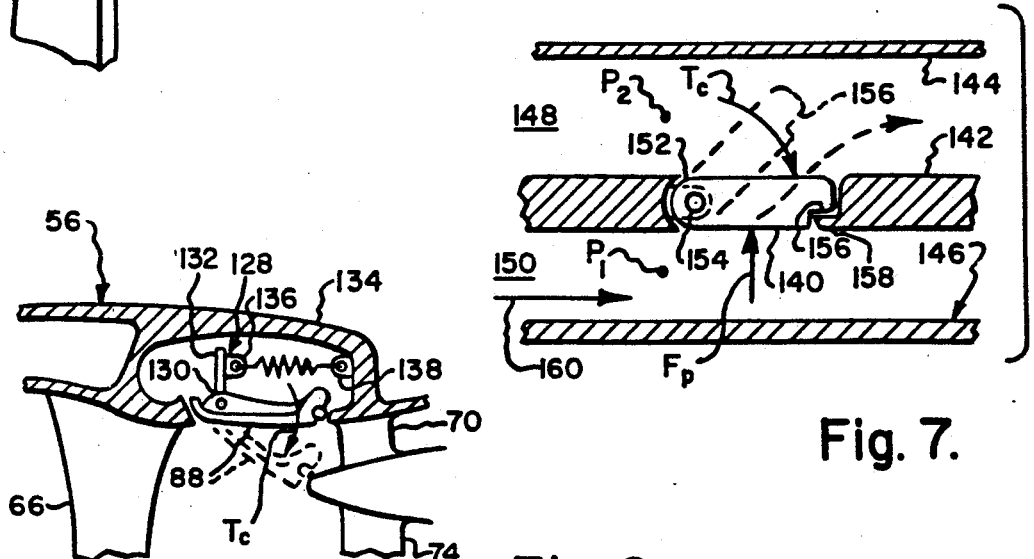
Fig. 6.
Fig. 7.

METHOD FOR AUTOMATIC BYPASS OPERATION

This invention was made with Government support Contract No. F33657-83-C-0281 awarded by the Department of the Air Force. The Government has certain rights in this invention.

This application is a division of application Ser. No. 07/522,024, filed May 11, 1990, pending.

CROSS-REFERENCE TO RELATED APPLICATION

This invention is related to application Ser. No. 07/522,346, filed May 11, 1990 by W. F. Siedlecki, Jr. et al., entitled "Passive Bypass Valve Assembly", which is commonly owned by the present assignee, now U.S. Pat. No. 5,113,649.

TECHNICAL FIELD

The present invention relates generally to gas turbine engines, and, more specifically, to an improved bypass valve assembly and method of operation.

BACKGROUND ART

A conventional variable cycle gas turbine engine includes a core engine driving a fan, and a bypass duct surrounding the core engine which is in flow communication with the fan. A conventional bypass valve is disposed at an upstream, inlet end of the bypass duct and is positionable in a closed position which substantially blocks flow from the fan into the bypass duct under certain conditions in the flight envelope of an aircraft being powered by the engine while allowing flow from the fan to be channeled into the core engine. The bypass valve is also positionable in an open position which allows substantially unobstructed flow from the fan into the bypass duct for bypassing a portion of the fan around the core engine while allowing the remaining portion of the fan air to be channeled through the core engine during operation of the aircraft at other conditions in the flight envelope.

Conventional bypass valve assemblies are relatively complex and are controlled in accordance with predetermined schedules corresponding to operation in the flight envelope of the aircraft. An exemplary conventional bypass valve assembly includes an annular ring valve which is translatable to open and close an annular inlet to the bypass duct. Conventional linkages and servovalves are used to translate the valve and are operatively connected to the control system of the engine for being responsive to the predetermined schedules contained in the control system for opening and closing the bypass valve at various conditions in the flight envelope.

In the open position, the bypass valve must provide for substantially unobstructed flow into the bypass duct for reducing or minimizing pressure losses therefrom which would decrease performance of the engine and reduce the cooling ability of the bypass air channeled in the bypass duct. The bypass air is typically used to improve cruise SFC and to cool downstream structures in the engine, such as, for example, a conventional augmentor and variable area exhaust nozzle, and any pressure losses due to the bypass duct would have to be accommodated, typically by increasing pressure in the bypass duct which decreases engine performance.

The bypass valve in the form of a mode selector valve in a conventional double bypass engine is typically positioned either in a fully open, or a fully closed position, although intermediate positions may be desirable in certain embodiments. It is also generally located in the fan frame having relatively little available space for the various linkages and actuators typically used for positioning the valve, and, therefore, the frame is made larger to accommodate these elements.

OBJECTS OF THE INVENTION

Accordingly, one object of the present invention is to provide a new and improved bypass valve assembly and method of operation.

Another object of the present invention is to provide a bypass valve assembly which is passive and is operable automatically in response to the flight envelope associated with the aircraft gas turbine engine.

Another object of the present invention is to provide a bypass valve assembly which is relatively compact, simple, lightweight, and does not require direct mechanical actuation by the main control of the gas turbine engine.

Another object of the present invention is to provide a bypass valve assembly having a valve which is automatically positionable in response to differential pressure acting across the valve.

DISCLOSURE OF THE INVENTION

A method of controlling airflow through a gas turbine engine flowpath includes automatically positioning a valve in response to differential pressure across the valve. An exemplary bypass valve assembly for carrying out the method of controlling fluid flow in the gas turbine engine includes a frame having a first fluid flow channel disposed in flow communication with second and third channels having a flow splitter therebetween. A plurality of circumferentially juxtaposed bypass valve doors are disposed in the frame, with each door having an upstream end pivotally connected to the frame, and also having a downstream end. The doors are positionable in an open position allowing fluid flow from the first channel to both the second channel and the third channel, and in a closed position substantially blocking fluid flow from the first channel to the second channel while allowing flow to the third channel. Means for automatically positioning the doors in the open and closed positions provide a differential pressure across the doors from the first channel to the second channel.

BRIEF DESCRIPTION OF DRAWINGS

The novel features believed characteristic of the invention are set forth and differentiated in the claims. The invention, in accordance with preferred, exemplary embodiments, together with further objects and advantages thereof, is more particularly described in the following detailed description taken in conjunction with the accompanying drawing in which:

FIG. 5 is an enlarged, perspective, top view of one of the bypass doors illustrated in FIGS. 3 and 4.

FIG. 6 is a schematic representation of another embodiment of the present invention including a bypass door joined to a linear spring effective for providing a closing torque.

FIG. 7 is a schematic representation of another embodiment of the invention showing a blow-off valve between two flow channels.

MODE(S) FOR CARRYING OUT THE INVENTION

Figure 1:
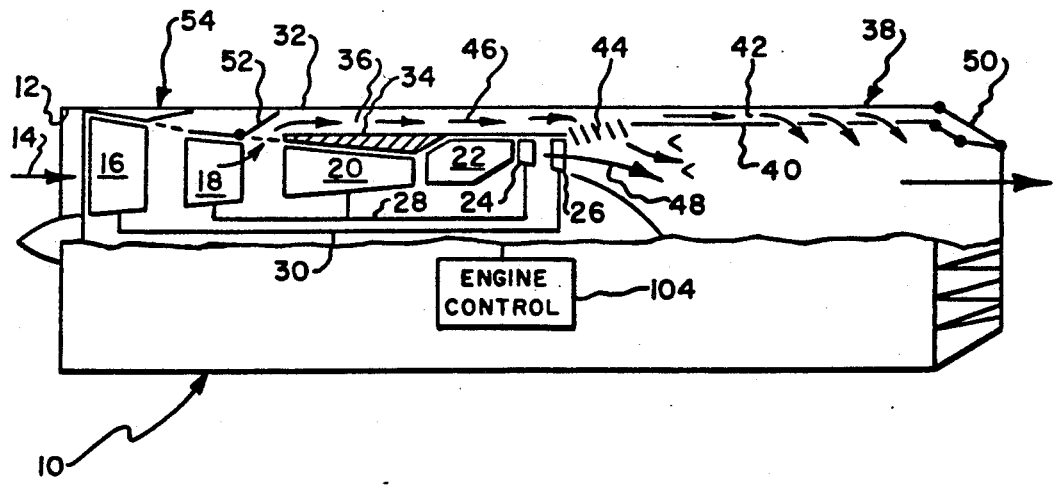
FIG. 1 is a schematic representation of a variable cycle, augmented, turbofan gas turbine engine for powering an aircraft which includes a bypass valve assembly in accordance with one embodiment of the present invention.

Illustrated in FIG. 1 is a schematic representation of an exemplary variable cycle, augmented, double bypass, turbofan gas turbine engine 10 for powering an aircraft in a flight envelope including subsonic and supersonic speeds at various altitudes. The engine 10 includes an annular inlet 12 for receiving ambient air 14 followed in turn by a conventional forward fan 16, aft fan 18, or low pressure compressor, high pressure compressor (HPC) 20, combustor 22, high pressure turbine (HPT) 24, and low pressure turbine (LPT) 26. The HPT 24 powers both the aft fan 18 and the HPC 20 through a conventional first shaft 28. The LPT 26 powers the forward fan 16 by a conventional second shaft 30.

The engine 10 further includes an outer casing 32 which is spaced from an inner casing 34 to define a conventional bypass duct 36 therebetween. Extending downstream from the outer casing 32 and the LPT 26 is a conventional afterburner, or augmentor, 38 which includes a conventional combustion liner 40 surrounded by a conventional annular afterburner duct 42.

The afterburner duct 42 is in flow communication with the bypass duct 36, and a conventional rear variable area bypass injector (VABI) 44 is disposed therebetween for mixing a portion of bypass air 46 channeled through the bypass duct 36 with combustion discharge gases 48 discharged from the LPT 26 for varying bypass ratio. The mixed air 46 and gases 48 are channeled inside the liner 40 of the afterburner 38 and discharged through a conventional variable area nozzle 50 disposed at the downstream end of the afterburner 38.

In this exemplary embodiment, the engine 10 is a double bypass engine including an optional, conventional bypass injector 52 disposed in a complementary annular opening in the inner casing 34 between the aft fan 18 and the HPC 20 in an intermediate portion of the bypass duct 36 for channeling a portion of the air 14, which is compressed in the aft fan 18, into the bypass duct 36 during certain operation of the engine 10. The injector 52 may be conventionally open or closed as desired or, in another embodiment, the injector 52 may be omitted which allows continuous flow of the portion of the air 14 from between the aft fan 18 and the HPC 20 into the bypass duct 36.

Figure 2:
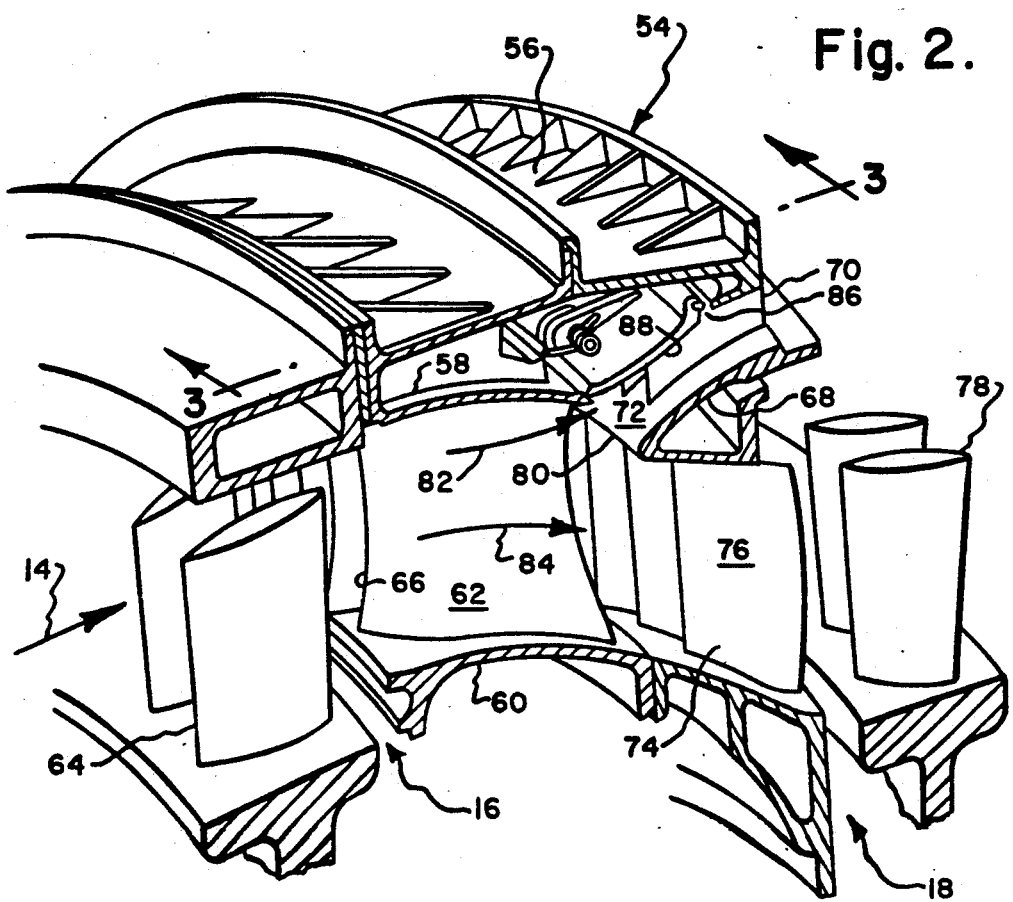
FIG. 2 is a perspective schematic representation of a portion of the bypass valve assembly illustrated in FIG. 1.
Figure 3:
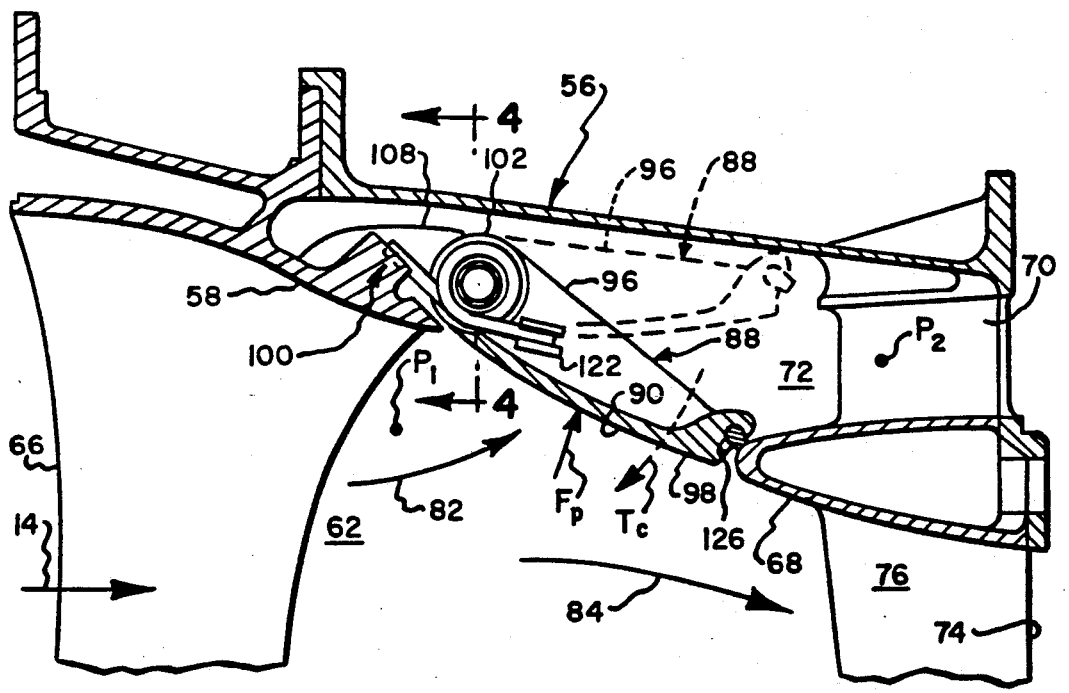
FIG. 3 is a sectional view of a portion of the bypass valve assembly illustrated in FIG. 2 taken along line 3—3.

The engine 10 is conventional except for a bypass valve assembly 54 in accordance with a preferred, exemplary embodiment of the invention disposed between the forward fan 16 and the aft fan 18. Illustrated in FIGS. 2 and 3 is the bypass valve assembly 54 shown in more particularity. The assembly 54 includes an annular fan frame 56 having an outer casing 58 and an inner casing 60 spaced radially inwardly from the outer casing 58 to define a first channel 62 for channeling the air 14. The forward fan 16 includes a plurality of conventional fan blades 64 which are conventionally connected to the second shaft 30, and a plurality of conventional fan outlet guide vanes (OGVs) 66 which are disposed in the first channel 62 for channeling the air 14. A conventional annular flow splitter 68 is conventionally fixedly disposed between the outer and inner casings 58 and 60 by a plurality of circumferentially spaced struts 70 extending between the outer casing 58 and the splitter 68 which casing and splitter define a second flow channel 72, or inlet to the bypass duct 36. The splitter 68 is conventionally connected to the inner casing 60 by a plurality of circumferentially spaced conventional inlet guide vanes (IGVs) 74 which defines therebetween a third flow channel 76, or inlet to the core engine. The aft fan 18 of the core engine includes the IGVs 74 and a plurality of conventional, circumferentially spaced blades 78 conventionally operatively connected to the first shaft 28. The splitter 68 includes a leading edge 80 which splits the air 14 into a bypass airflow 82 which is channeled into the second channel 72, and a core airflow 84 which is channeled into the third channel 76.

The assembly 54 further includes an annular opening 86 in the outer casing 58 facing the splitter 68. Disposed in the annular opening 86 is a plurality of circumferentially juxtaposed bypass valve doors 88. In an exemplary embodiment, there are 12 doors 88 disposed over the 360° circumferential extent of the opening 86.

Figure 4:
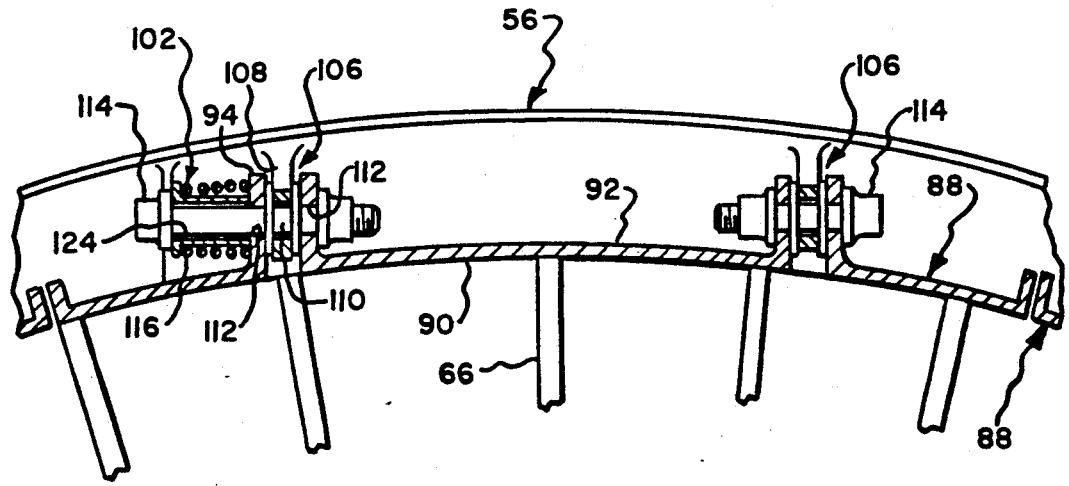
FIG. 4 is an upstream looking transverse view of a portion of the bypass doors illustrated in FIG. 3 taken along line 4—4.

As illustrated in FIGS. 3-5, each of the doors 88 includes an inner surface 90 which faces the splitter 68 and the bypass airflow 82 and forms a portion of the boundary of the second channel 72. The doors 88 also include an outer surface 92 which faces opposite to the inner surface 90. The doors 88 are relatively thin for reducing weight and include a plurality of conventional stiffening ribs 94 on the outer surface 92. Each of the doors 88 is pivotally connected to the outer casing 58 at an upstream end 96 of the door 88 as described in more detail below. The door 88 also includes a downstream end 98.

Each of the doors 88 is positionable in an open position as illustrated in FIG. 2, for example, and as illustrated in dashed line in FIG. 3 wherein the door 88 is disposed generally parallel to the outer casing 58 in the annular opening 86 to allow for substantially unobstructed flow of the bypass airflow 82 from the first channel 62 to the second channel 72. The doors 88 are also positionable in a closed position as illustrated in solid line in FIG. 3 inclined relative to the outer casing 58 for substantially blocking flow of the bypass airflow 82 from the first channel 62 to the second channel 72, and thereby channeling all of the air 14 as core airflow 84 into the third channel 76 of the HPC 20. During operation of the engine 10, the bypass airflow 82 impinges against the inner surface 90 of the door 88 for generating a resultant pressure force $F_p$ acting on the door 88 which is an aerodynamic fluid force for opening the door 88, or closing the door 88 as described below.

The assembly 54 further includes means 100 for automatically positioning the doors 88 in the open and closed positions by providing a differential pressure across the doors 88 in the second channel 72 to provide a torque on the doors 88. More specifically, the differential pressure across the doors 88 may be defined as the difference between a pressure $P_1$ of the air 14 in the first channel 62 upstream of the doors 88 minus a pressure $P_2$ in the bypass duct 36, which may be represented at a position in the second channel 72 immediately downstream of the doors 88. During operation of the engine 10, the differential pressure $P_1 - P_2$, which may be represented as static pressure, has values ranging from positive values to negative values, with positive values creating positive values of the pressure force $F_p$ which effects a torque to rotate the doors counterclockwise and thereby open the doors 88, and the negative differential pressure $P_1 - P_2$ causing negative values of the pressure force $F_p$ which rotate the doors clockwise to the closed position thereof.

In one embodiment of the invention, the method of controlling bypass airflow 82 through the second channel 72 comprises automatically positioning the valve doors 88 in response to the differential pressure $P_1 - P_2$ across the valve doors 88. The differential pressure $P_1 - P_2$ across the doors 88 is obtained by the positioning means 100 by generating a differential pressure between the forward fan 16 and the bypass duct 36. This may be accomplished by opening and closing the rear VABI 44 for selectively channeling portions of the bypass airflow 46 from the bypass duct 36 to inside the liner 40.

More specifically, the engine 10 as illustrated in FIG. 1 further includes a conventional engine control 104 which is operatively connected to the rear VABI 44 as is conventionally known. In one embodiment of the method invention, the engine control 104 opens the rear VABI 44 for channeling bypass airflow 46 inside the augmentor liner 40 for generating a positive differential pressure $P_1 - P_2$ to open the doors 88 for double bypass operation of the engine 10 through both the second channel 72 and the bypass injector 52.

The control 104 is also effective for closing the rear VABI 44 so that the bypass airflow 46 flows from the bypass duct 36 into the augmentor bypass channel 42 with little or no bypass airflow 46 being channeled inside the liner 40. With the rear VABI 44 closed, a negative differential pressure $P_1 - P_2$ is generated across the doors 88 which closes the doors 88 for obtaining single bypass operation of the engine 10 with bypass airflow being channeled solely from the aft fan 18 through the bypass injector 52 into the bypass duct 36.

A component test of the doors 88 has shown that the doors 88 may be adequately positioned between the open and closed positions automatically by solely the aerodynamic pressure forces acting across the doors 88 due to the differential pressure $P_1 - P_2$. Accordingly, conventional actuators are not necessary for positioning the doors 88, which are simply allowed to free float to various angular positions solely in response to the differential pressure $P_1 - P_2$.

The differential pressure $P_1 - P_2$ is effectively used in accordance with another embodiment of the invention by having the positioning means 100 further include in a particular embodiment, a conventional torsional spring 102 associated with each of the doors 88 joining a respective door 88 to the frame 56 for providing a spring closing torque $T_c$, as illustrated in FIGS. 3 and 5 acting on the door 88 in a direction opposite to the opening pressure force $F_p$. The torsional spring 102 is preferably made from commercially available 17-7PH material which is suitable for elevated temperature applications up to about 380° C.

The closing torque $T_c$ has a minimum, first value $T_1$ obtained by conventionally positioning the spring 102 for providing the closing torque first value $T_1$ in the doors 88 closed position which is at least large enough to close the door 88 against the force of gravity acting on the door 88 when the pressure force $F_p$ is zero, which may occur for example when the engine 10 is not running. It is to be noted that the doors 88 are disposed circumferentially around the opening 86 and at least some of the doors 88, without the use of the spring 102, would simply remain in the open position due to gravity, i.e. those doors disposed at the bottom of the opening 86 which are disposed upside down relative to those shown in FIG. 3. Accordingly, the spring 102 is conventionally sized and positioned for at least overcoming the force of gravity on the door 88 for placing the door 88 initially in the closed position. As the door 88 is opened, the spring 102 is correspondingly tightened which increased the closing torque $T_c$ up to a second value $T_2$ in the door open position which is greater than the closing torque first value $T_1$.

However, in the first embodiment described above which does not include the springs 102, the component test has indicated that although the bottom, upside down doors 88 are initially open upon engine start-up, the aerodynamic pressure forces $F_p$ are nevertheless effective for automatically closing the doors 88 as required, as well as then opening the doors 88 as required.

Referring again to the second embodiment disclosed above, it is to be noted that the conventional torsion spring 102 is sized and positioned relative to 30 the door 88 for providing a closing torque $T_c$ which increases as the door is moved from the closed position to the open position. Springs conventionally provide an increase in restoring force as they are compressed or expanded which requires continuously increasing force $F_p$ to open the door 88. Therefore, the actual angular position of the door 88 is automatically controlled by the amount of the resultant pressure force $F_p$ generated by the differential pressure $P_1 - P_2$.

In this preferred embodiment of the invention, each of the doors 88 as illustrated in FIG. 4 includes a pair of circumferentially spaced hinge joints, or simple hinges, 106 which pivotally connect the upstream end 96 of the door 88 to the outer casing 58. Each hinge 106 includes an elongate support 108 extending from the outer casing 58 which includes an aperture 110 at a distal end thereof. A complementary pair of apertures 112 is disposed in a respective pair of the ribs 94 which sandwich the support 108, and a conventional hinge bolt 114 is suitably positioned through the apertures 110 and 112 for allowing the doors 88 to pivot relative to the outer casing 58. A conventional bushing (not shown) may be provided between the bolt 114 and the apertures 110 and 112 for reducing friction therebetween.

In the preferred embodiment illustrated in FIGS. 4 and 5, the hinge bolt 114 of one of the hinges 106 has a length sufficient for supporting a plurality of conventional coils 116 of the torsional spring 102 disposed coaxially therewith. For example, at least four coils 116 may be used. The spring 102 further includes a first fixed end 118 at one side of the coils 116 which is fixedly connected to the outer casing 58. For example, the first end 118 may be simply rested against a stop portion 58a of the outer casing 58 for preventing the spring 102 from unwinding to maintain torsional forces in the spring 102. The spring 102 also includes a second fixed end 120 on the opposite side of the coils 116, which is fixedly connected to the door 88. For example, the second end 120 may simply be trapped between a spaced pair of tabs 122 extending from one of the ribs 94 for preventing the spring 102 from unwinding to maintain torsional forces in the spring 102. Both the first and second ends 118 and 120 may slide relative to the stop 58a and the tabs 122, while still providing torsional reaction surfaces to allow the torsional spring 102 to function conventionally.

A conventional bushing 124 is disposed between the coils 116 and the bolt 114 to prevent wear of the bolt 114 due to abrasion from the coils 116. The bushing may be made from commercially available A286.

The spring 102 is sized and configured so that a positive differential pressure of $P_1-P_2$ across the door 88 in the second channel 72 is effective for opening the door 88 against the closing torque $T_c$, and a negative differential pressure of $P_1-P_2$ across the door 88 in the second channel 72 is effective for closing the door 88. In a preferred embodiment, the positive differential pressure required to open the door 88 should be as low as possible for reducing pressure losses. For example, the positive different pressure may be no greater than about 0.5 psi to ensure that the door 88 opens relatively quickly upon application of a positive differential pressure $P_1-P_2$. It is to be noted that the differential pressure $P_1-P_2$ has a range of values during operation of the engine 10 and the positioning means 100 is effective for opening the doors at intermediate open positions as the differential pressure increases in the range for providing automatic positioning of the doors 88 over a range of intermediate open positions.

As illustrated for example in FIGS. 3 and 5, each of the doors 88 includes at the downstream end 98 thereof, an elongate resilient seal 126 suitably secured to the downstream end 98, for example by attachment to a slot therein. The seal is effective for contacting the splitter 68 when the door 88 is placed in the closed position to ensure good sealing of the door 88 against the splitter 68. The seal 126 is also effective for providing vibration damping of the door 88 due to any vibration thereof caused by impingement of the bypass airflow 82 against the doors 88. In the preferred embodiment the seal is made from commercially available KALREZ made by E. I. DuPont Company, which is effective at temperatures up to about 400° C. In alternate embodiments of the invention, the seal 126 may be eliminated where leakage around the downstream end 98 is acceptable.

As illustrated in FIGS. 2, 3 and 5, the door downstream end 98 is generally coextensive with the outer casing 58 when the door is in the open position for providing a generally smooth flowpath transition at the door downstream end 98 and the outer casing 58 which defines a portion of the second channel 72. However, at intermediate open positions, the door downstream end 98 is disposed at corresponding equilibrium positions in the second channel 72 wherein the resultant fluid pressure force $F_p$ generates a corresponding fluid torque which balances the closing torque $T_c$ from the spring 102.

Illustrated in FIG. 6 is another embodiment of the present invention wherein the positioning means 100 includes a straight pin 128 disposed generally perpendicularly outwardly from the door outer surface 92. The pin 128 includes a first end 130 fixedly attached to the door at the hinge 106 and a second end 132 disposed oppositely to the first end 130. In this embodiment, the spring is in the form of a conventional linear spring 134 which has a first end 136 fixedly attached to the pin second end 132, and a second end 138 suitably joined to the frame 56. The pin 128 and the spring 134 are sized and configured so that the spring 134 generates the required closing torque $T_c$.

Illustrated in FIG. 7 is another embodiment of the present invention wherein the bypass doors 88 are in the form of blow-out doors 140. In this embodiment of the invention, the doors 140 are initially disposed in a closed position coextensively with an intermediate casing 142. Spaced outwardly from the intermediate casing 142 are an outer casing 144 and an inner casing 146, which define with the intermediate casing 142 a first channel 148 and a second channel 150, respectively. Just as in the FIG. 5 embodiment of the invention, the door 140 is hinged at its upstream end 152 to the intermediate casing 142 and includes a conventional torsional spring 154 sized and positioned for initially positioning the door 140 in the closed position generally coextensive with the intermediate casing 142. For example, the door 140 may also have a slot 156 at its downstream end which is initially biased against a complementary tab 158 of the intermediate casing 142 by the torsional spring 154.

When a differential pressure $P_1-P_2$ exists across the door 140, for example with the pressure $P_1$ in the channel 150 being greater than the pressure $P_2$ in the channel 148, a resultant pressure force $F_p$ acts on the door 140. The torsional spring 154 is sized and configured to allow the door 140 to open into the channel 148 by rotation about its upstream end 152 to bleed a portion of the airflow 160 from the channel 150 into the channel 148. This structure may be used for bleeding airflow from a conventional compressor defining the channel 150 when the differential pressure $P_1-P_2$ reaches a predetermined value. For values below the predetermined value, the closing torque $T_c$, imposed by the spring 154 on the door 140, closes the door 140 against the tab 158.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. In a variable bypass turbofan engine having a bypass duct surrounding a core engine, a fan disposed in flow communication with said bypass duct and said core engine, and a hinged valve door positionable between open and closed positions in said bypass duct, a method of controlling airflow through said bypass duct comprising generating differential pressure between said fan and said bypass duct and automatically positioning said valve door in response to said differential pressure across said valve door.

2. A method according to claim 1 wherein said engine further includes an augmentor having a combustion liner disposed in flow communication with said bypass duct and said core engine, and a rear variable area bypass injector (VABI) disposed between said core engine and said augmentor liner, and said method further includes opening and closing said rear VABI for selectively channeling portions of airflow from said bypass duct to inside said liner for generating said differential pressure.

3. A method according to claim 2 wherein said engine is a double bypass turbofan engine having a plurality of circumferentially disposed ones of said hinged valve doors disposed as a first bypass between an upstream end of said bypass duct and said fan, and said engine further includes a second bypass defined by an annular opening and a bypass injector operatively disposed therein downstream of said first bypass in an intermediate portion of said bypass duct for bypassing a portion of compressed airflow from said core engine into said bypass duct, and said method further includes opening said rear VABI for channeling bypass airflow inside said augmentor liner for generating a positive differential pressure to open said hinged valve doors for double bypass operation of said engine.

4. A method according to claim 3 further including closing said rear VABI for generating a negative differential pressure to close said hinged valve doors for single bypass operation of said engine.

* * * * *